INVENTORS.
BRUNO ZILLIE
DAVID THOMAS
BY E. T. McCabe
ATTORNEY.

INVENTORS.
BRUNO ZILLIE
DAVID THOMAS
BY E. T. McCabe

ATTORNEY.

United States Patent Office 3,332,358
Patented July 25, 1967

3,332,358
TROLLEY FEEDER APPARATUS
David Thomas and Bruno Zillie, Calgary, Alberta, Canada, assignors to Swift & Company, Chicago, Ill., a corporation of Illinois
Filed Nov. 27, 1964, Ser. No. 414,134
7 Claims. (Cl. 104—93)

This invention relates to an improved apparatus for stopping and releasing, singly, items moving along a path. More specifically, the present invention is an improved apparatus for stopping trolleys on a rail and releasing them separately and singly for continued movement along the rail.

Rail feeder systems, and particularly overhead trolley rails systems, are used widely for the storage and transport of goods and items within plants and warehouses and the like. A notable example of overhead trolley systems is found in a meat packing plant where animal carcasses and portions of carcasses are suspended from overhead trolleys for storage and transport about the plant and sometimes throughout the processing operations. In handling goods and items thus transported, it is often necessary at various points throughout the rail system to provide devices for halting the travel of trolleys or the like and releasing the trolleys to continue at the option of an operator. In overhead rail systems such as used in packing plants this is usually accomplished by a spring loaded rod which is biased to extend into the path of a trolley. Trolleys are then released by pulling the rod to overcome the spring to the extent that it is moved from the path of the trolley. However, such apparatus often permits two or more trolleys to pass before it can be returned to halt succeeding trolleys.

Accordingly, it is a principal object of the present invention to provide an improved apparatus for stopping trolleys on a rail and releasing them separately and singly as desired by an operator.

Basically, the present invention is an apparatus comprising a pair of arms pivotally supported adjacent a trolley rail and extending in opposite directions from one another, each arm having a trolley blocking finger extending sustantially normal to the outward ends thereof toward the trolley rail and the arms being linked together by a link member which is operable to pivot the outward ends of both arms in unison away from the rail; and a further trolley blocking finger mounted on an inward end of one arm so as to block a trolley on the rail only when the first mentioned fingers are pivoted away from the rail.

Further objects and advantages of the present invention will become apparent upon reading the following detailed specification in conjunction with illustrations of a preferred embodiment of the invention in the figures wherein.

Figure 2:
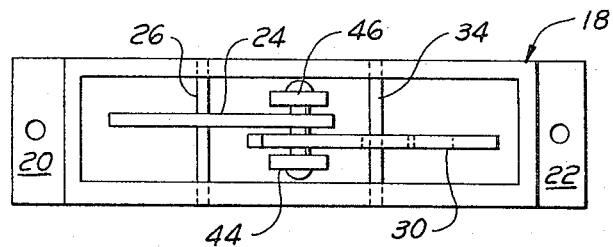
FIGURE 2 is a top plan view, in partial section, of the apparatus of FIGURE 1.

Referring specifically to the preferred embodiments of the present invention illustrated in the drawings, it will be seen that the device is mounted adjacent the trolley rail 10. The preferred device was devised for control of overhead trolleys, on overhead rail systems, from which animal carcasses are suspended. However, it will be apparent to one skilled in the art that the device may also be employed with floor mounted rail systems, and is operable with either system if mounted horizontally of the rail as well as vertically of the rail. In the illustrated embodiment, the preferred device is mounted directly above the rail 10 and spaced a distance which will permit engagement of trolleys thereon, a leading trolley 12 and following trolley 14 being shown in the figures.

The subject stop and release device is comprised of a frame generally 18 which is of an open rectangular configuration having mounting flanges 20 and 22 at opposite ends thereof by which the device can be attached to suitable supporting structure (not shown).

Figure 1:
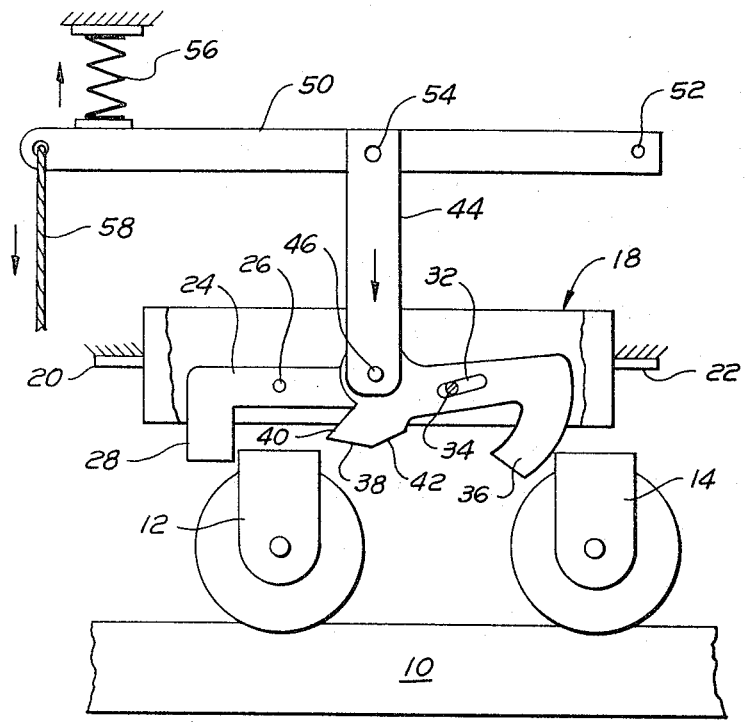
FIGURE 1 is a side elevation of the apparatus of the present invention, with portions broken away, showing the trolley stop and release mechanism in a position to retain trolleys while supported on a rail.

A first arm 24 is pivotally mounted at about its midpoint within the frame 18 upon a pivot pin 26 secured in the latter. The first arm 24 terminates at the outward, or left, end in a depending release finger 28. The latter extends substantially normal to the first arm 24 and is preferably straight extending a sufficient distance downwardly to engage only the uppermost portion of a trolley 12, as seen in FIGURE 1.

A second arm 30 is also pivotally supported within the frame 18 extending oppositely (to the right) of arm 24. The second arm preferably has an elongated slot 32 extending slightly to either side of its approximate midpoint, and a pivot pin 34, fixed in frame 18, extends therethrough. The slot 32 is necessary in the preferred embodiment to permit a slight amount of movement of the second arm 30 along its longitudinal axis. Such movement is required as the two arms 24 and 30 are hingedly connected respecting one another as well as independently pivotally mounted on pins 26 and 34. Thus, it will be apparent that at least one of the arms 24, 30 must allow for longitudinal movement where the two arms are to be pivotable. The slotted construction, however, could be on either arm or at their hinged connection.

The second arm 30 terminates at its outward end (to the right in the figures) in a depending stop finger 36 which extends substantially normal to arm 30 approximately the same distance as the release finger 28 extends from arm 24. However, it is preferred that the stop finger 36 be of arcuate shape curving inwardly toward the opposite end of arm 30. A third or hold finger 38 extends downwardly from the inward end of either arm 24 or 30, preferably the latter second arm 30 as shown in the figures. Hold finger 38 extends downwardly a lesser distance than fingers 28 and 36, the length thereof being insufficient to contact a trolley when the release finger 28 is in the engaging position as shown in FIGURE 1. Also the hold finger 38 is preferably flared to present a forwardly angled leading edge 40 (to the left side) and a biased trailing edge 42 (to the right side). Edge 42 is preferably angled sufficiently so that it will be substantially vertical when the second arm 30 is pivoted to the position shown in FIGURE 4.

Finally, the two inward ends of arms 24 and 30 are preferably hingeably connected together and to a link member 44 by a common hinge pin 46. Preferably, the link member 44 is in the form of a bifurcated yoke that extends vertically above the connected ends of arms 24, 30. However, it will become apparent to one skilled in the art that the link member 44 could also be separately hingeably connected to each of the two arms 24, 30 at either the inward or outward ends thereof. The essential feature of the link member 44 is that it functions, when actuated by an operator, to pivot the outward ends of arms 24, 30 and the fingers 28, 36 respectively, in unison.

Figure 4:
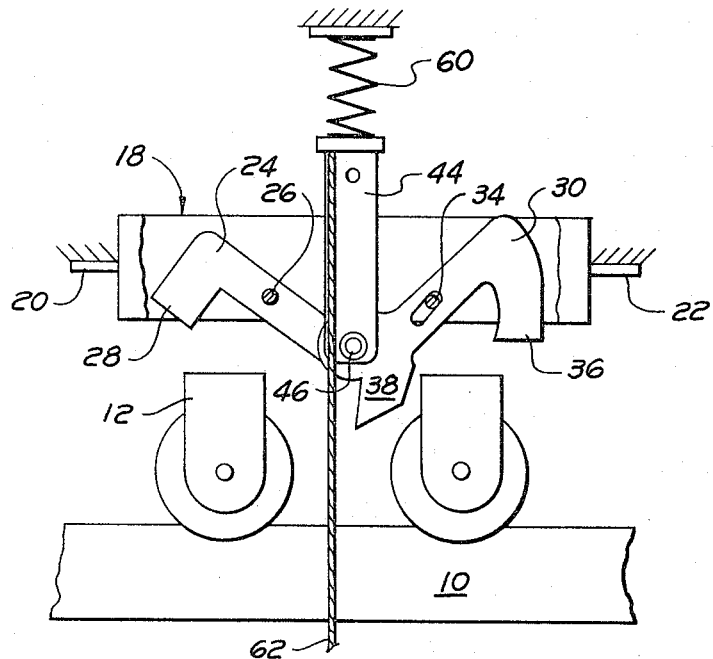
FIGURE 4 is a side elevation view, with parts broken away, of the apparatus of FIGURE 1 in a trolley release position.
Figure 3:
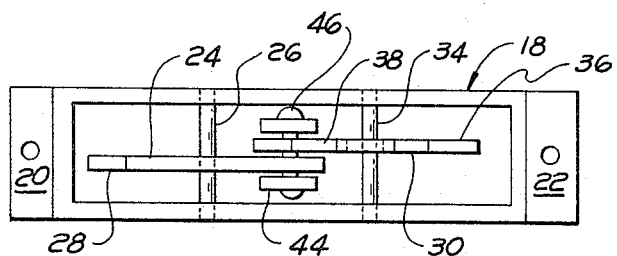
FIGURE 3 is a bottom plan view of the apparatus of FIGURE 1.

In operation the above-described device can be actuated by an operator through the link member 44 to pivot the arms 24, 30 thereby raising and lowering the release and stop fingers 28, 36, respectively. When the link member 44 is actuated to lower the aforementioned fingers toward rail 10 (by raising link 44 in the illustrated device) the stop finger 36 will prevent forward movement, to the left in the figures, of any following trolley such as trolley 14. At the same time the release finger 28 will be in a position to retain any leading trolley, such as trolley 12, which is between the latter finger and stop finger 36. Also, the hold finger 38 will be in an elevated position above the trolley 12 permitting the latter to advance forwardly until it contacts the release finger 28. Subsequently, the leading trolley 12 may be released by reversing the movement of link member 44 to pivot arms 24, 30 upwardly, thereby raising the release and stop fingers 28, 36 respectively. In the latter condition, illustrated in FIGURE 4, the leading trolley 12 is free to advance forwardly and may be in fact urged in that direction by the downward movement of the hold finger 38. At the same time, the stop finger 36 will also be raised sufficiently for the next following trolley 14 to advance into contact with the hold finger 38 as shown in FIGURE 4. Thereafter, the link member 44 is returned to the first mentioned position, returning fingers 28 and 36 to their lowered position and raising the hold finger 38. By the latter motion, the curved stop finger 36 will enter between, and thereby separate, the next following trolley 14 and any subsequent trolley (not shown). The latter motion will also cause the stop finger 36 to gently urge trolley 14 forwardly past the hold finger and into contact with the release finger 28 whereupon the device is in condition to next release that trolley at the option of an operator.

It will be obvious that any suitable mechanism may be provided for an operator to manually move the link member 44. For example, a lever 50 pivoted at point 52 to one side of the device and connected with the lever 44 by a tie rod 54 may be provided as shown in FIGURE 1. This mechanism is preferably biased upwardly by a tension spring 56 and provided with a handle cord 58 within the grasp of an operator. Similarly, the link member 44 may be biased upwardly by a directly connected spring 60 and also provided with a cord 62 by which it can be momentarily urged downwardly, as shown in FIGURE 4.

Obviously many modification and variations of the invention as hereinbefore set forth may be made without departing from the spirit and scope thereof, and therefore only such limitations should be imposed as are indicated in the appended claims.

We claim:

1. An improved trolley stop and release apparatus for use with a trolley rail whereon trolleys move along a path, said apparatus comprising: a pair of oppositely extending arms, said arms being pivotally mounted at about their respective midpoints; a link hingedly connected to similar points on both arms whereby movement of said link will cause the outer ends of both said arms to move in unison; first and second fingers connected to the outer ends of both of said arms and extending substantially normal thereto for at least a given distance sufficient to be movable into and out of the path of a trolley when said link is moved; and an additional finger connected to the inward end of one of said arms and said link and extending normal thereto a lesser distance and movable into the path of a trolley only upon movement of said link to remove said first and second fingers from said path.

2. An improved trolley stop and release apparatus for use with a trolley rail whereon trolleys move along a path, said apparatus comprising: a pair of oppositely extending arms, said arms being pivotally mounted at about their respective midpoints; a link hingedly connected to the inwardly extending ends of both arms whereby the movement of said link will cause the outer ends of both said arms to move in unison, one of said arms and said link having a slot and a pivot to permit limited longitudinal movement with respect to one another; first and second fingers connected to the outer ends of both of said arms and extending substantially normal thereto for at least a given distance sufficient to be movable into and out of the path of a trolley when said link is moved; and an additional finger connected to the inward end of one of said arms and said link and extending normal thereto a lesser distance and movable into the path of a trolley only upon movement of said link to remove said first and second fingers from said path.

3. An improved trolley stop and release apparatus for use with a trolley rail whereon trolleys move along a path, said apparatus comprising: a pair of oppositely extending arms, said arms being pivotally mounted at about their respective midpoints; a link hingedly connected to similar points on both arms whereby vertical movement of said link will cause the outer ends of both said arms to move in unison; first and second fingers connected to the outer ends of both of said arms and extending substantially normal thereto for at least a given distance sufficient to be movable into and out of the path of a trolley when said link is moved, one of said fingers being arcuate in shape and curving toward the inward ends of said arms so as to urge a trolley inwardly when said arms are caused to move into the path of said trolley; and an additional finger connected to the inward end of one of said arms and extending normal thereto a lesser distance and movable into the path of a trolley only upon movement of said link to remove said first and second fingers from said path.

4. An improved trolley stop and release apparatus for use with a trolley rail whereon trolleys move along a path, said apparatus comprising: a pair of oppositely extending arms, said arms being pivotally mounted at about their respective midpoints; a link hingedly connected to the inwardly extending ends of both arms whereby movement of said link will cause the outer ends of both said arms to move in unison, one of said arms and said link having a slot at one of said pivot mounts and hinge connections to permit limited longitudinal movement with respect to one another; first and second fingers connected to the outer ends of both of said arms and extending substantially normal thereto for at least a given distance sufficient to be movable into and out of the path of a trolley when said link is moved, one of said fingers being arcuate in shape and curving toward the inward ends of said arms so as to urge a trolley inwardly when said arms are caused to move into the path of said trolley; and an additional finger connected to the inward end of one of said arms and extending normal thereto a lesser distance and movable into the path of a trolley only upon movement of said link to remove said first and second fingers from said path.

5. An improved trolley stop and release apparatus for use with a trolley rail whereon trolleys move along a path, said apparatus comprising: first and second arms extending oppositely to one another, said arms being pivotally mounted at about their respective midpoints, said first and second arms being hingedly connected together at their inward ends and one of said arms having a slot at said midpoint pivot to permit longitudinal movement thereof; a yoke pivotally connected to the inwardly extending ends of both arms whereby movement of said yoke will cause the outer ends of both said arms to move in unison; first and second fingers connected to the outer ends of said first and second arms and extending substantially normal to said arms for at least a given distance sufficient to be movable into and out of the path of a trolley when said link is moved; and an additional finger connected to the inward end of one of said arms and extending normal thereto a lesser distance and movable into the path of a trolley only upon the movement of said yoke to remove said first and second fingers from said path.

6. An improved trolley stop and release apparatus for use with a trolley rail whereon trolleys move along a path, said appartus comprising: first and second arms extending oppositely to one another, said arms being pivotally mounted at about their respective midpoints, one of said arms having a slot at said midpoint pivot to permit longitudinal movement thereof, said first and second arms being pivotally connected together at their inward ends; a yoke pivotally connected to the inwardly extending ends of both arms whereby vertical movement of said yoke will cause the outer ends of both said arms to move in unison; first and second fingers connected to the outer ends of both said arms and extending substantially normal thereto for at least a given distance sufficient to be movable into and out of the path of a trolley when said link is moved, one of said fingers being arcuate in shape and curving toward the inward ends of said arms so as to urge a trolley inwardly when said arms are caused to move into the path of said trolley; and an additional finger connected to the inward end of one of said arms and extending normal thereto a lesser distance and movable into the path of a trolley only upon movement of said yoke to remove said first and second fingers from said path.

7. An improved trolley stop and release apparatus for use with a trolley rail whereon the trolleys move along a path, said apparatus comprising: first and second arms extending oppositely to one another, said arms being pivotally mounted at about their respective midpoints, said first arm having a slot at said midpoint pivot to permit longitudinal movement thereof, said first and second arms being hingedly connected together at their inward ends; a yoke hingedly connected to the inwardly extending ends of both arms whereby movement of said yoke will cause the outer ends of both said arms to move in unison; a trolley stop finger connected to the outer end of said second arm, both said trolley stop finger and said trolley release finger extending substantially normal to said arms for at least a given distance sufficient to be movable into and out of the path of a trolley when said link is moved, said trolley stop finger being arcuate in shape and curving toward the inward end of said first arm so as to urge a trolley inwardly when said arm is caused to move into the path of said trolley; and a trolley hold finger connected to the inward end of said first arm and extending normal thereto a lesser distance and movable into the path of a trolley only upon the movement of said yoke to remove said stop and release fingers from said path.

References Cited
UNITED STATES PATENTS

| | | | |
|---|---|---|---|
| 333,633 | 1/1886 | Huey et al. | 104—214 |
| 347,597 | 8/1886 | Harvey | 104—211 |
| 931,203 | 8/1909 | Holmes | 104—253 |
| 2,575,396 | 11/1951 | Schenk | 104—253 X |
| 3,055,311 | 9/1962 | Sgriccia et al. | 104—93 |
| 3,056,360 | 10/1962 | Burmeister et al. | 104—96 |

ARTHUR L. LA POINT, *Primary Examiner.*

J. E. BABER, *Assistant Examiner.*